US010227103B2

(12) United States Patent
Yasuhara et al.

(10) Patent No.: US 10,227,103 B2
(45) Date of Patent: Mar. 12, 2019

(54) SADDLE-RIDING-TYPE VEHICLE SENSOR UNIT ATTACHMENT STRUCTURE

(71) Applicant: HONDA MOTOR CO., LTD., Tokyo (JP)

(72) Inventors: Mafumi Yasuhara, Tsuru (JP); Tomohiro Kudo, Kikuchi-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/558,144

(22) PCT Filed: Mar. 10, 2016

(86) PCT No.: PCT/JP2016/057577
§ 371 (c)(1),
(2) Date: Sep. 13, 2017

(87) PCT Pub. No.: WO2016/152557
PCT Pub. Date: Sep. 29, 2016

(65) Prior Publication Data
US 2018/0043959 A1  Feb. 15, 2018

(30) Foreign Application Priority Data
Mar. 20, 2015  (JP) .................................. 2015-058072

(51) Int. Cl.
*B62K 19/40* (2006.01)
*B62L 1/00* (2006.01)
(Continued)

(52) U.S. Cl.
CPC ............... *B62K 19/40* (2013.01); *B62J 99/00* (2013.01); *B62K 19/38* (2013.01); *B62L 1/00* (2013.01); *B62J 2099/002* (2013.01)

(58) Field of Classification Search
CPC ............................ B62K 19/40; B62K 19/38
(Continued)

(56) References Cited

U.S. PATENT DOCUMENTS 4,465,322 A * 8/1984 Hayashi .................. B60T 8/261
303/115.6
5,217,087 A * 6/1993 Ikegami ................ B60Q 1/122
180/219
(Continued)

FOREIGN PATENT DOCUMENTS

JP  4-256860 A  9/1992
JP  2002-29395 A  1/2002
(Continued)

OTHER PUBLICATIONS

International Search Report, issued in PCT/JP2016/057577 (PCT/ISA/210), dated May 31, 2016.
(Continued)

*Primary Examiner* — Tony H Winner
*Assistant Examiner* — Conan D Duda
(74) *Attorney, Agent, or Firm* — Birch, Stewart, Kolasch & Birch, LLP

(57) ABSTRACT

In a saddle-riding-type vehicle sensor unit attachment structure, a brake caliper bracket that holds the brake caliper is attached to the rearward extension stay of the front fork, the wheel speed sensor is attached to a lower position than the rearward extension stay of the brake caliper bracket, and the sensor cable is arranged toward an upward direction at an inner side in a vehicle width direction of the rearward extension stay and is then drawn to an outer side in a vehicle width direction of the brake caliper bracket at an upper position than the rearward extension stay to be supported by the brake caliper bracket.

5 Claims, 9 Drawing Sheets

(51) Int. Cl.
  *B62J 99/00* (2009.01)
  *B62K 19/38* (2006.01)
(58) Field of Classification Search
  USPC .................................................... 280/288.4
  See application file for complete search history.

(56) References Cited

U.S. PATENT DOCUMENTS

| | | | |
|---|---|---|---|
| 8,177,250 B2* | 5/2012 | Fukuyama | B62K 11/04 |
| | | | 180/229 |
| 2007/0159352 A1 | 7/2007 | Sahashi et al. | |
| 2013/0026731 A1 | 1/2013 | Mikura et al. | |
| 2015/0042062 A1* | 2/2015 | Takatsuka | B62K 21/02 |
| | | | 280/264 |
| 2015/0076790 A1* | 3/2015 | Sugimoto | B62K 19/38 |
| | | | 280/283 |
| 2016/0121958 A1* | 5/2016 | Asano | B60G 21/05 |
| | | | 280/124.103 |
| 2016/0137253 A1* | 5/2016 | Hirayama | B62K 5/05 |
| | | | 280/124.103 |
| 2016/0144923 A1* | 5/2016 | Asano | B62K 5/05 |
| | | | 280/124.103 |
| 2016/0152293 A1* | 6/2016 | Hirayama | B62K 5/05 |
| | | | 280/124.103 |
| 2017/0088216 A1* | 3/2017 | Ohno | B60G 17/0155 |
| 2017/0267245 A1* | 9/2017 | Nakashima | B62L 3/023 |
| 2018/0031595 A1* | 2/2018 | Yasuhara | B62L 3/08 |
| 2018/0086415 A1* | 3/2018 | Inase | F16D 65/18 |
| 2018/0117961 A1* | 5/2018 | Ono | B62J 99/00 |

FOREIGN PATENT DOCUMENTS

| | | |
|---|---|---|
| JP | 2005-98941 A | 4/2005 |
| JP | 2006-248296 A | 9/2006 |
| JP | 2013-32051 A | 2/2013 |
| TW | 200602623 A | 1/2006 |

OTHER PUBLICATIONS

Search Report issued in Taiwan application No. 105108275, dated May 23, 2017.

* cited by examiner

SADDLE-RIDING-TYPE VEHICLE SENSOR
UNIT ATTACHMENT STRUCTURE

TECHNICAL FIELD

The present invention relates to a sensor unit attachment structure of a saddle-riding-type vehicle such as a motorcycle.

Priority is claimed on Japanese Patent Application No. 2015-58072, filed on Mar. 20, 2015, the contents of which are incorporated herein by reference.

BACKGROUND

Devices which include a pulsar plate (pulsar ring) that rotates integrally with a wheel and a wheel speed sensor that detects the rotation of the pulsar plate based on the rotation of the pulsar plate are known as a detection means that detects the wheel speed of a saddle-riding-type vehicle. A sensor cable for outputting a signal that is detected by the wheel speed sensor to a control unit is connected to the wheel speed sensor that is used in the detection means. A variety of structures have been proposed as an attachment structure of a sensor unit that includes the wheel speed sensor and the sensor cable (for example, refer to Patent Document 1).

In Patent Document 1, an attachment structure of a sensor unit that detects a rotation speed of a front wheel of a saddle-riding-type vehicle is described.

In the saddle-riding-type vehicle described in Patent Document 1, a rearward extension stay that extends in a vehicle rearward direction is provided on a lower edge part of a front fork that supports the front wheel. A brake caliper is attached directly to an extension end of the rearward extension stay. A sensor stay that holds a wheel speed sensor is attached to a substantially middle position in the extension direction of the rearward extension stay. A sensor cover having a bent plate shape overlaps and is attached to an outer part in a vehicle width direction of the sensor stay. The wheel speed sensor is held by the sensor stay and the sensor cover at a lower end position of the sensor stay in a state where the wheel speed sensor is interposed between the sensor stay and the sensor cover. Specifically, a bolt fastening part used for fastening the sensor stay and the sensor cover to each other is provided at upper and lower sections of a holding position of the wheel speed sensor at lower ends of the sensor cover and the sensor stay. By the fastening at the bolt fastening parts, the wheel speed sensor is interposed between and is held by the sensor stay and the sensor cover.

A sensor cable that is drawn from the wheel speed sensor is arranged from a lower end position of the sensor stay toward the vehicle rearward direction and is then drawn via an opening that is formed between the sensor stay and the sensor cover to the vicinity of the front fork. The sensor cable that is drawn to the vicinity of the front fork is held by a clamp part that is provided to extend at an upper part of the sensor cover and is arranged toward an upward direction substantially along the front fork.

RELATED ART DOCUMENTS

Patent Documents

[Patent Document 1] Japanese Unexamined Patent Application, First Publication No. 2006-248296

SUMMARY OF INVENTION

Problems to be Solved by the Invention

However, in the sensor unit attachment structure described in Patent Document 1, the sensor cable that is drawn from the wheel speed sensor is arranged once toward the vehicle rearward direction so as to avoid the upper and lower bolt fastening parts. Then, the sensor cable is bent in a vehicle frontward upward direction, is drawn via the opening between the sensor stay and the sensor cover to the vicinity of the front fork, and is arranged toward the vehicle upward direction along the front fork. Therefore, the sensor cable greatly meanders in the vehicle front-to-rear direction, and the cable length of the sensor cable is long resulting in a steep rise in product cost and unnecessary slack of the sensor cable.

An object of an aspect of the present invention is to provide a saddle-riding-type vehicle sensor unit attachment structure capable of allowing a cable length of a sensor cable to be as short as possible and arranging the sensor cable in a state where a slant is prevented.

Means for Solving the Problem (1) A saddle-riding-type vehicle sensor unit attachment structure according to an aspect of the present invention includes a front fork that pivotally supports a front wheel and that has a rearward extension stay which extends toward a vehicle rearward direction at a lower edge part, a brake disk that is supported by the front wheel so as to be rotatable integrally with the front wheel, a pulsar plate which is supported by the front wheel so as to be rotatable integrally with the front wheel and in which a plurality of pickup holes are arranged along a rotation direction, a brake caliper that is supported by the rearward extension stay and that gives a frictional force to the brake disk at the time of braking, and a sensor unit that has a wheel speed sensor which detects a rotation speed of the pulsar plate based on a rotation of the pulsar plate and a sensor cable that is connected to the wheel speed sensor and that outputs a signal which is detected by the wheel speed sensor to a control unit, wherein a brake caliper bracket that holds the brake caliper is attached to the rearward extension stay, the wheel speed sensor of the sensor unit is attached to a lower position than the rearward extension stay of the brake caliper bracket, and the sensor cable that is drawn from the wheel speed sensor is arranged toward an upward direction at an inner side in a vehicle width direction of the rearward extension stay and is then drawn to an outer side in a vehicle width direction of the brake caliper bracket at an upper position than the rearward extension stay to be supported by the brake caliper bracket.

According to the above aspect (1), the sensor cable that is drawn from the wheel speed sensor passes under the inner side in the vehicle width direction of the rearward extension stay at the lower edge part of the front fork and extends upward. Then, the sensor cable is drawn to the outer side in the vehicle width direction of the brake caliper bracket and is supported by the brake caliper bracket. Accordingly, although the sensor cable is slightly bent in the vehicle width direction as the sensor cable passes under the inner side in the vehicle width direction of the rearward extension stay, the sensor cable is drawn to the vicinity of the brake caliper without greatly meandering in the vehicle front-to-rear direction.

(2) In the above aspect (1), the brake caliper bracket may have a frontward extension part that extends so as to overlap in a side view with the rearward extension stay at a more inner side in the vehicle width direction than the rearward extension stay, and the sensor cable may be inserted through a space between the rearward extension stay and the frontward extension part to be arranged toward an upward direction.

According to the above aspect (2), the displacement of the sensor cable, which passes under the inner side in the vehicle width direction of the rearward extension stay and extends upward, to the inner side in the vehicle width direction is regulated by the frontward extension part of the brake caliper bracket at a position opposed to the rearward extension stay. Accordingly, the sensor cable can be arranged close to the pulsar plate and the brake disk without interfering with the pulsar plate and the brake disk. Therefore, components that are arranged in the vicinity of the front wheel can be arranged further collectively at a center side in the vehicle width direction. Thereby, the structure around the front wheel can be made compact.

(3) In the above aspect (1) or (2), a regulation rib that comes into contact with a side surface of the wheel speed sensor and that regulates a displacement of the wheel speed sensor may be formed on an attachment part of the wheel speed sensor of the brake caliper bracket.

According to the above aspect (3), the displacement of the wheel speed sensor can be regulated by the regulation rib of the brake caliper bracket. Therefore, it is possible to simplify a fixation part of the wheel speed sensor with respect to the brake caliper bracket without causing a position displacement of the wheel speed sensor.

(4) In the above aspect (3), the regulation rib may be formed to be directed along a tangential direction of an arrangement circumference of the pickup holes of the pulsar plate.

According to the above aspect (4), the wheel speed sensor is regulated along the tangential direction of the arrangement circumference of the pickup holes by the regulation rib. Therefore, it is possible to detect the pickup hole by the wheel speed sensor in a state where the fixation direction of the wheel speed sensor is appropriate.

(5) In any one of the above aspects (1) to (4), the wheel speed sensor may be arranged such that at least part of the wheel speed sensor is overlapped with the front fork in a vehicle front view.

According to the above aspect (5), at least part of the front side of the vehicle speed sensor is covered by the front fork. Therefore, it is possible to protect the wheel speed sensor from mud and gravel when the vehicle is traveling.

(6) In any one of the above aspects (1) to (5), a connection part of a brake hose that is connected to a brake operation part may be provided on an edge part on a vehicle front side of the brake caliper, and the sensor cable that is drawn to an outer side in the vehicle width direction of the brake caliper bracket may be arranged to be inserted through a space between the brake caliper bracket and the connection part.

According to the above aspect (6), the sensor cable that is drawn to the outer side in the vehicle width direction of the brake caliper bracket is inserted through a gap between the brake caliper bracket and the connection part of the brake caliper to be arranged. Therefore, the sensor cable can be arranged compactly around the brake caliper without causing the sensor cable to greatly meander.

Advantage of the Invention

According to an aspect of the present invention, the sensor cable that is drawn from the wheel speed sensor passes under the inner side in the vehicle width direction of the rearward extension stay at the lower edge part of the front fork and extends upward. Then, the sensor cable is drawn to the outer side in the vehicle width direction of the brake caliper bracket and is supported by the brake caliper bracket. Therefore, it is possible to allow the cable length of the sensor cable to be as short as possible and arrange the sensor cable in a state where a slant is prevented.

DESCRIPTION OF THE EMBODIMENTS

Figure 1:
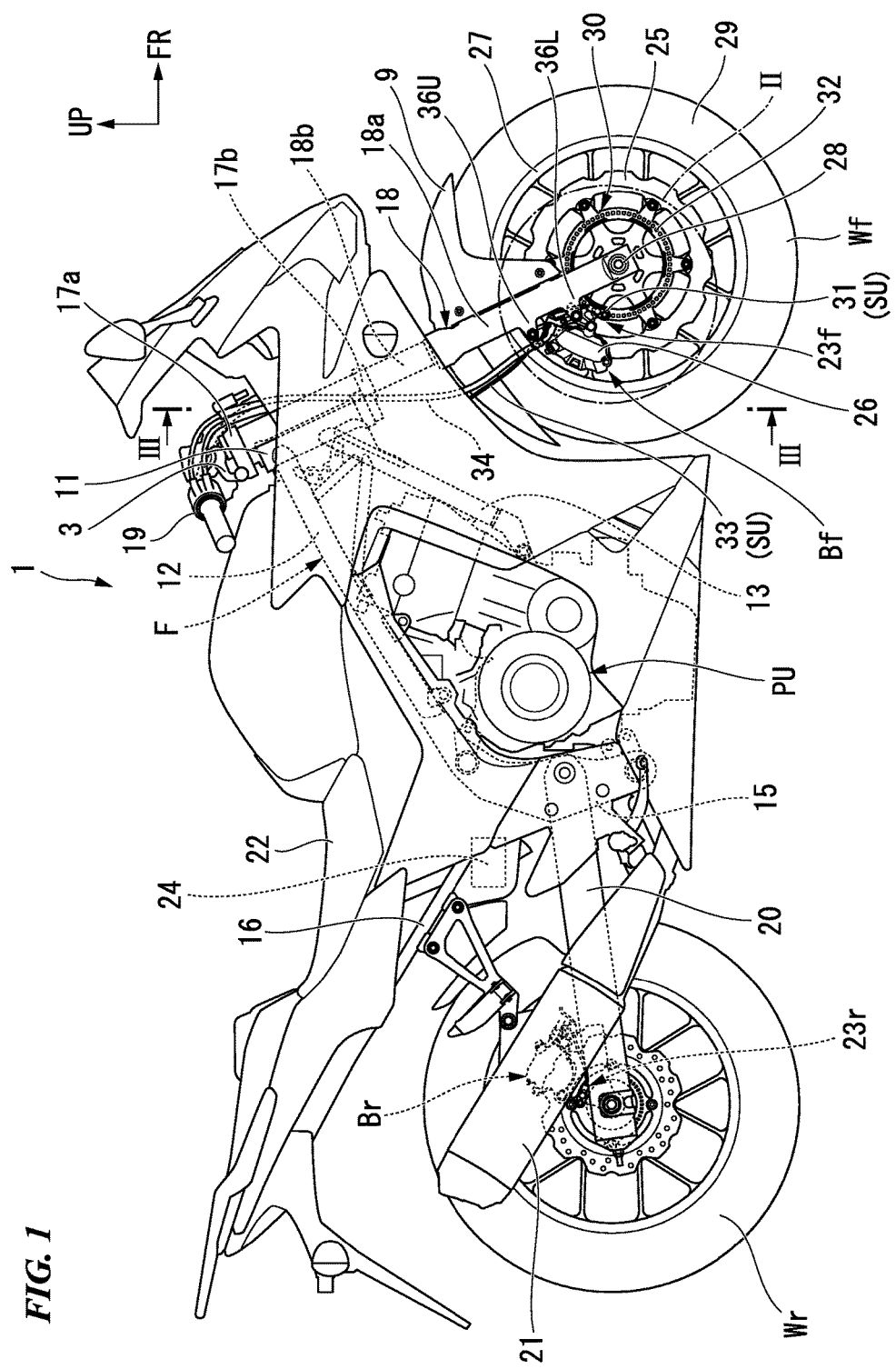
FIG. 1 is a side view of a saddle-riding-type vehicle according to an embodiment of the present invention.

Hereinafter, an embodiment of the present invention will be described with reference to the drawings. Note that, front, rear, right, and left directions in the following description are the same as front, rear, right, and left directions of a vehicle described below if there is no particular description.

In addition, in the drawings referred to in the following description, an arrow FR that indicates the front of the vehicle, an arrow LH that indicates the left of the vehicle, and an arrow UP that indicates the upside of the vehicle are shown.

First, an overall configuration of a vehicle according to the present embodiment is described with reference to FIG. 1. The vehicle according to the present embodiment is a motorcycle 1 as a form of a saddle-riding-type vehicle.

FIG. 1 is a view seen from the right side of the motorcycle 1. A vehicle body frame F of the motorcycle 1 includes a head pipe 11 at a front end, a pair of right and left main frames 12 that extend rearward and downward from the head pipe 11, a pair of right and left downward frames 13 that extend downward from a lower position than the main frame 12 of the head pipe 11, a pivot frame 15 that extends downward from a rear end part of the main frame 12, and a pair of right and left seat rails 16 that extend rearward and upward from an upper part of the pivot frame 15.

A steering shaft is rotatably supported by the head pipe 11. An upper end part of the steering shaft is connected to a top bridge 17*a*. A lower end part of the steering shaft is connected to a bottom bridge 17*b*. Upper end parts of a pair of right and left front forks 18 are supported by the top bridge 17*a* and the bottom bridge 17*b*. A front wheel Wf is rotatably supported by a part between lower end parts of the right and left front forks 18. A bar handle 19 is attached to the top bridge 17*a*. The front wheel Wf is steerable by a rotation operation of the bar handle 19. A front fender 9 that covers an upside of the front wheel Wf is attached to the right and left front forks 18.

A front end part of a swing arm 20 that supports a rear wheel Wr is supported swingably upward and downward by the pivot frame 15. A cushion unit (not shown) is provided between the swing arm 20 and the pivot frame 15.

A power unit PU that integrally includes an engine and a transmission is arranged in a region surrounded by the main frame 12, the downward frame 13, and the pivot frame 15. The power unit PU is supported by the vehicle body frame F. An output shaft of the power unit PU is connected to the rear wheel Wr via a chain (not shown) such that power is transmittable. The motorcycle 1 includes a muffler 21 that is connected to an exhaust pipe of the engine. The motorcycle 1 includes a seat 22 on which an occupant is seated.

Disk brake devices Bf, Br are adopted for both the front wheel Wf and the rear wheel Wr in the motorcycle 1 according to the present embodiment. In the motorcycle 1, a wheel speed detection device 23*f* for detecting a rotation speed of the front wheel Wf is provided. In the motorcycle 1, a wheel speed detection device 23*r* for detecting a rotation speed of the rear wheel Wr is provided. A signal detected by each of the wheel speed detection devices 23*f*, 23*r* is output to a control unit 24 and is used, for example, for detection of a slip rate of the front wheel Wf and the rear wheel Wr, detection of a vehicle speed, and the like.

Figure 2:
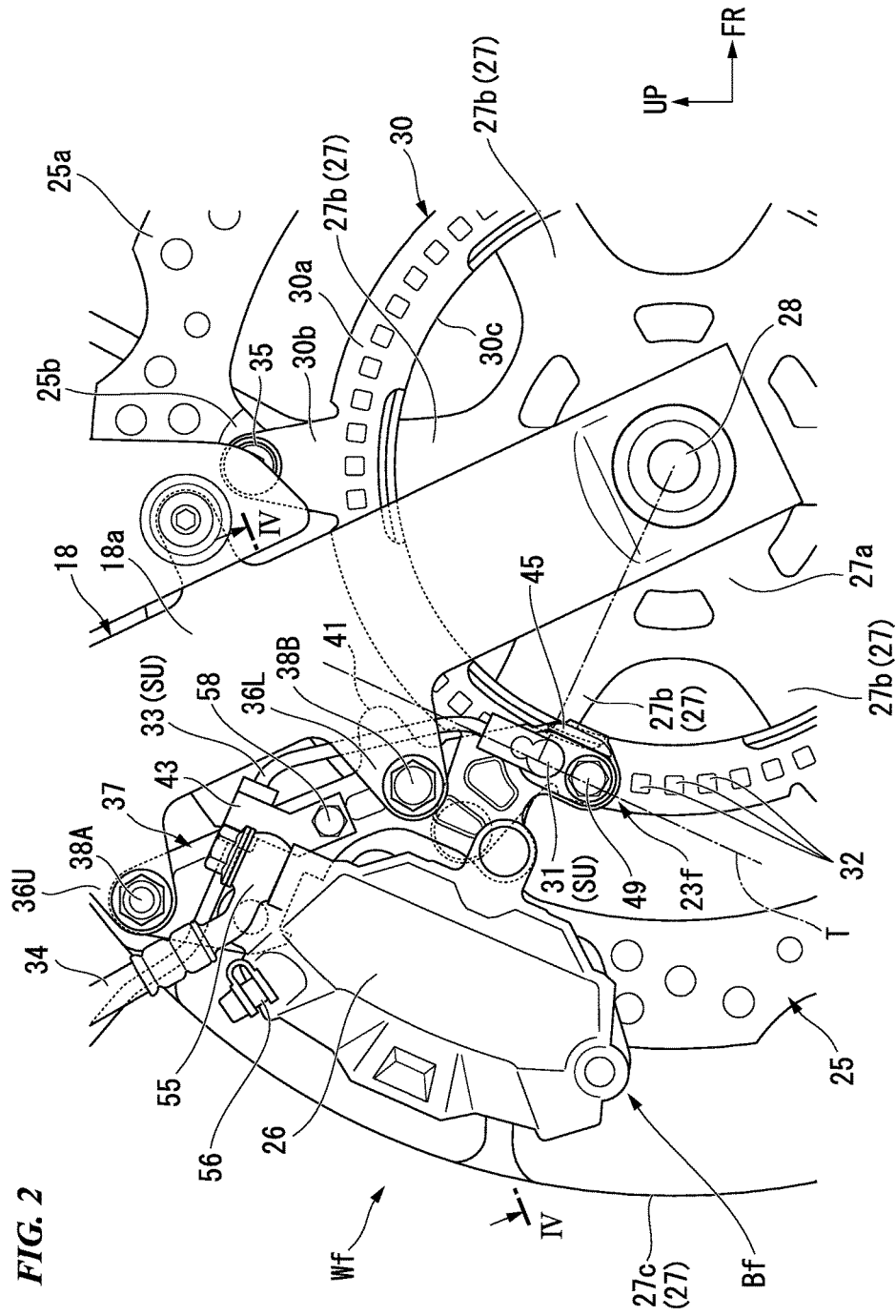
FIG. 2 is an enlarged view of a II part of FIG. 1 of the saddle-riding-type vehicle according to the embodiment.
Figure 3:
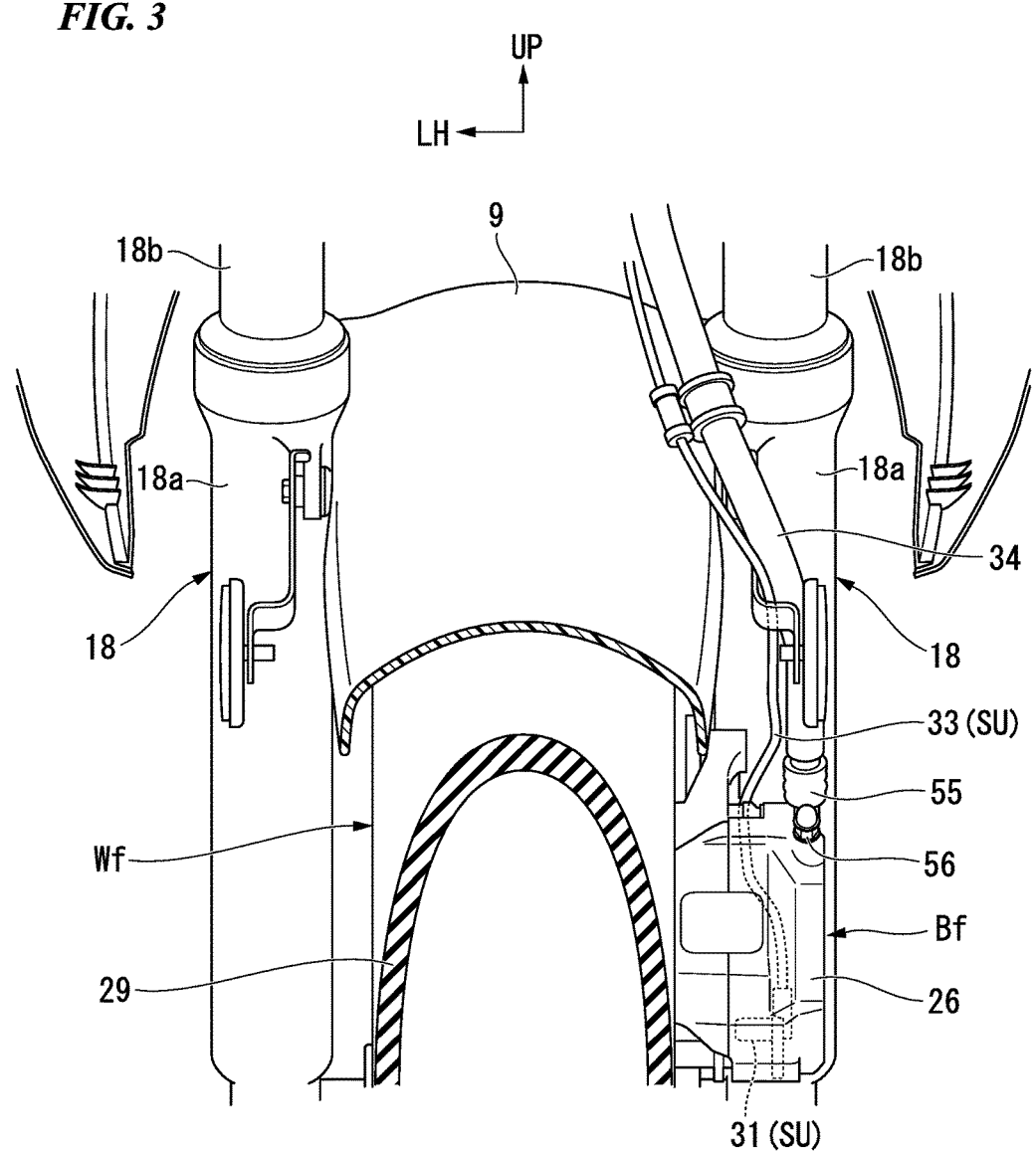
FIG. 3 is a cross-sectional rear view that corresponds to a III-III cross-section of FIG. 1 of the saddle-riding-type vehicle according to the embodiment.
Figure 4:
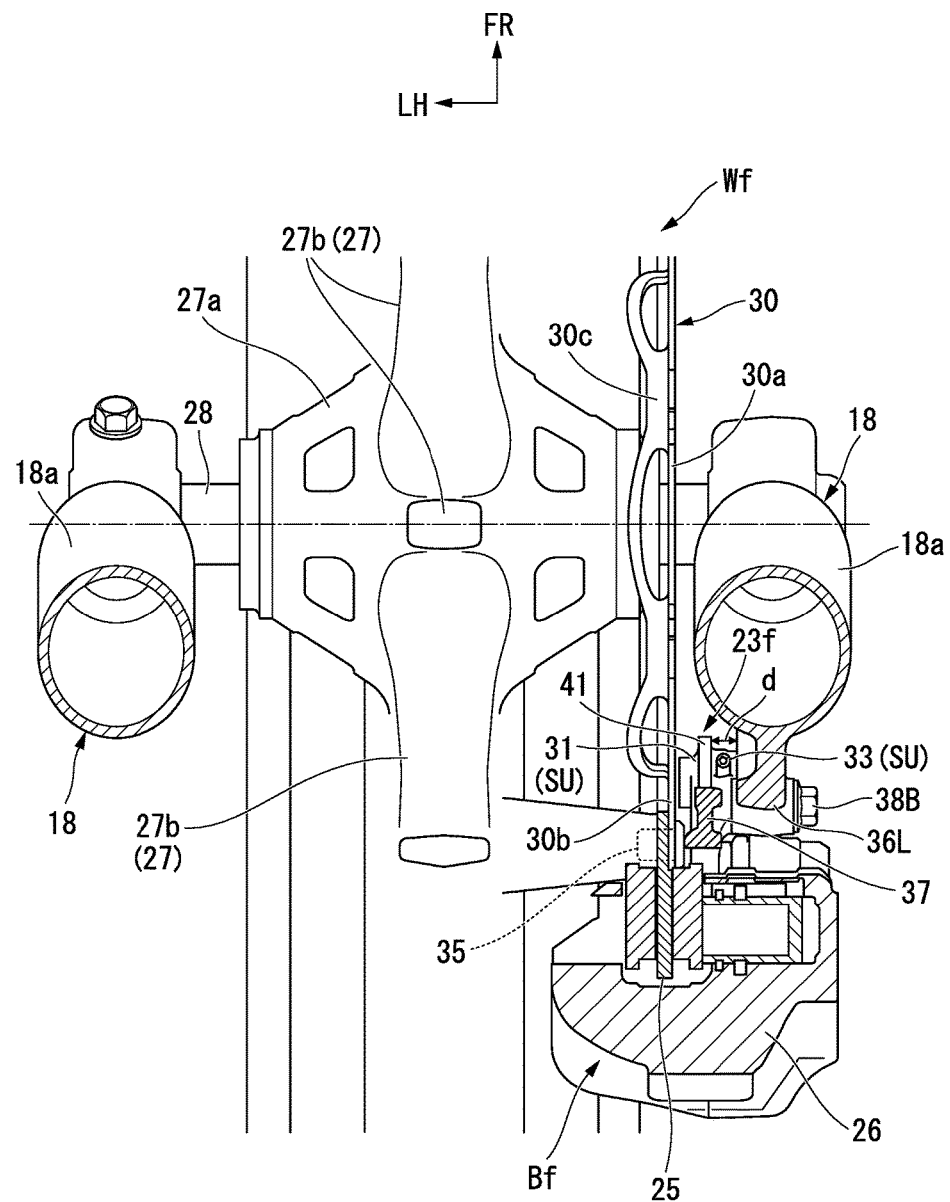
FIG. 4 is a cross-sectional view that corresponds to a IV-IV cross-section of FIG. 2 of the saddle-riding-type vehicle according to the embodiment.
Figure 5:
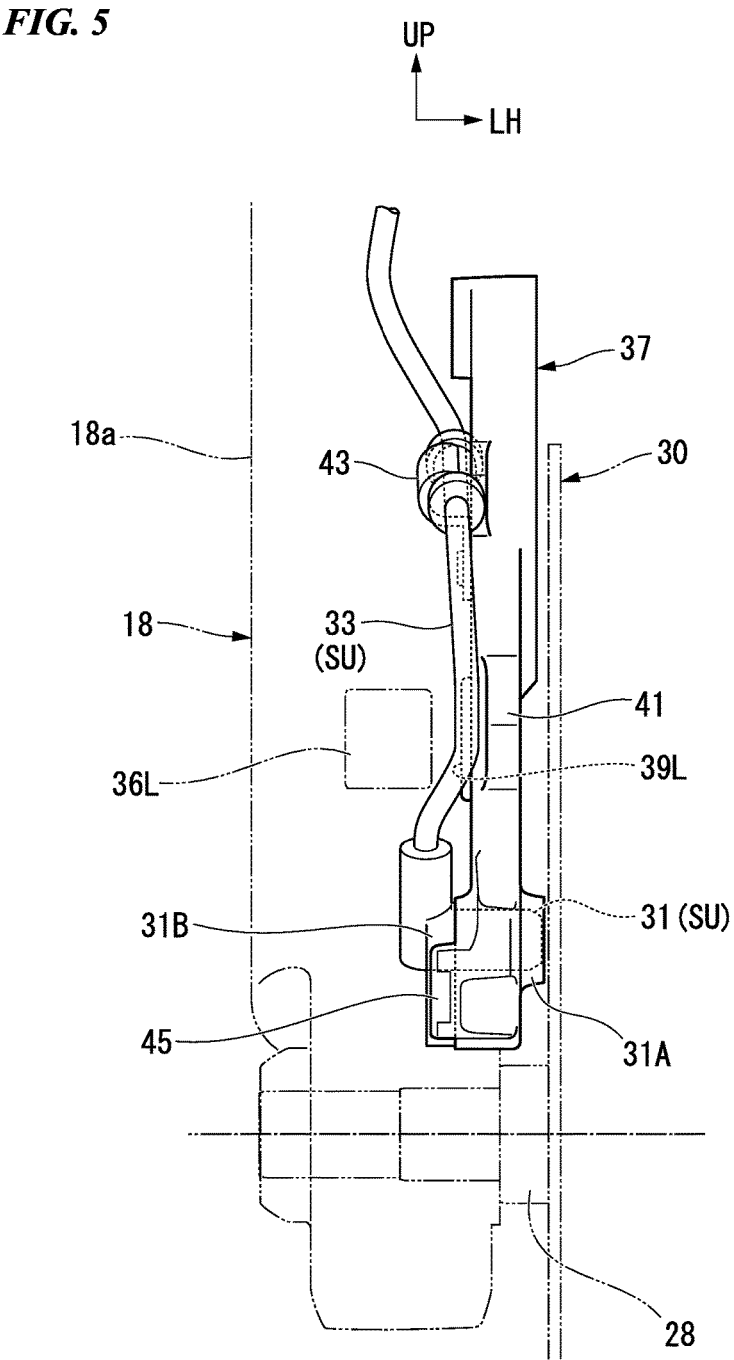
FIG. 5 is a view seen from a vehicle front side of a wheel speed sensor according to the embodiment.

FIG. 2 is a view in which a II part of FIG. 1 is enlarged. FIG. 3 is a view showing a cross-section that corresponds to a III-III cross-section of FIG. 1. FIG. 4 is a view showing a cross-section that corresponds to a IV-IV cross-section of FIG. 2. FIG. 5 is a view seen from a vehicle front side of the wheel speed detection device 23*f* of the front wheel Wf.

As shown in FIG. 2, FIG. 3, FIG. 4, and FIG. 5, the brake device Bf of the front wheel Wf includes a brake disk 25 that has an annular shape and that rotates integrally with the front wheel Wf and a brake caliper 26 that is supported by the front fork 18 and that gives a frictional force to the brake disk 25 at the time of braking. In the present embodiment, the brake disk 25 is attached integrally to a right side part of a wheel 27 of the front wheel Wf. The brake caliper 26 is supported by the right front fork 18.

The brake disk 25 has a braking wall 25*a* that is held by the brake caliper 26 at the time of braking and that has an annular shape and a plurality of disk attachment parts 25*b* that protrude inward in a radial direction from an inner circumferential edge part of the braking wall and that have a tongue shape. The brake disk 25 is fastened and fixed to a right side part of the wheel 27 at the plurality of disk attachment parts 25*b*. A brake hose 34 that is connected to a brake lever 3 (refer to FIG. 1) is connected to an upper part of the brake caliper 26 via an ABS circuit (not shown).

The wheel speed detection device 23*f* of the front wheel Wf includes a pulsar ring 30 (pulsar plate) that integrally rotates with the front wheel Wf and a pickup sensor 31 (wheel speed sensor) that is supported by the front fork 18 and that detects the rotation of the pulsar ring 30. In the present embodiment, the pulsar ring 30 is integrally attached to a right side part of the wheel 27 of the front wheel Wf. The pickup sensor 31 is supported by the right front fork 18. The pulsar ring 30 is arranged on the inner side in the radial direction of the brake disk 25. The pulsar ring 30 is arranged at a right side part of the wheel 27 together with the brake disk 25 concentrically with the wheel 27.

The pulsar ring 30 has a base wall 30*a* in which a plurality of pickup holes 32 are formed in the circumferential direction at even intervals and which has an annular shape, a plurality of ring attachment parts 30*b* that protrude outward in the radial direction from an outer circumferential edge part of the base wall 30*a* and that have a tongue shape, and a reinforcement rib 30*c* (refer to FIG. 4) that is formed by bending a region, which corresponds to a position between the adjacent ring attachment parts 30*b*, of an inner circumferential part of the base wall 30*a* inward in the vehicle width direction.

The pickup sensor 31 has a pickup coil that generates a pulse signal by a magnetic flux change associated with the rotation of the pickup hole 32 of the pulsar ring 30. The pickup sensor 31 outputs the pulse signal generated by the pickup coil to the control unit 24. A sensor cable 33 is drawn from the pickup sensor 31. The sensor cable 33 is connected to the control unit 24. The pickup sensor 31 and the sensor cable 33 constitute a sensor unit SU in the present embodiment.

The front fork 18 of the present embodiment is an erect front fork in which an outer tube 18*a* is arranged at a lower position, and an inner tube 18*b* is arranged at an upper position. An axle 28 of the front wheel Wf is supported by a lower end of the outer tube 18*a*. An axis center part of the wheel 27 is rotatably supported via a bearing (not shown) by the axle 28. The front fork 18 is not limited to an erect type and may be an inverted type.

As shown in FIG. 2, the wheel 27 of the front wheel Wf has a hub 27*a*, a spoke 27*b*, and a rim 27*c*. The hub 27*a*, the spoke 27*b*, and the rim 27*c* are integrally formed by casting and the like. The hub 27*a* constitutes the axis center part of the wheel 27. A plurality of spokes 27*b* extend radially outward in the radial direction from the hub 27*a*. Each extension end of the spoke 27*b* is connected to an inner circumferential part of the rim 27*c*. A tire 29 is attached to an outer circumferential part of the rim 27*c*.

A boss part is provided to protrude on a right side surface of a plurality of spokes 27*b* of the wheel 27. The brake disk 25 and the pulsar ring 30 are fastened together and fixed to the boss part by a bolt 35 (refer to FIG. 2 and FIG. 4).

The front fork 18 is slanted toward a front lower direction from a support position by the top bridge 17*a* and the bottom bridge 17*b*. A pair of rearward extension stays 36U, 36L that extend in a vehicle rearward direction is provided on a lower edge part (outer tube 18*a*) of the front fork 18. The rearward extension stays 36U, 36L are provided to be separated from each other vertically in an axial direction of the outer tube 18*a*. The upper and lower rearward extension stays 36U, 36L are formed such that a width in the vehicle width direction is narrower than an outer diameter of the outer tube 18*a*. The upper and lower rearward extension stays 36U, 36L extend toward a vehicle rearward direction from a substantially center position in the vehicle width direction of the outer tube 18*a*. A brake caliper bracket 37 that holds the brake caliper 26 is fastened and fixed to extension ends of the upper and lower rearward extension stays 36U, 36L by bolts 38A, 38B.

Figure 6:
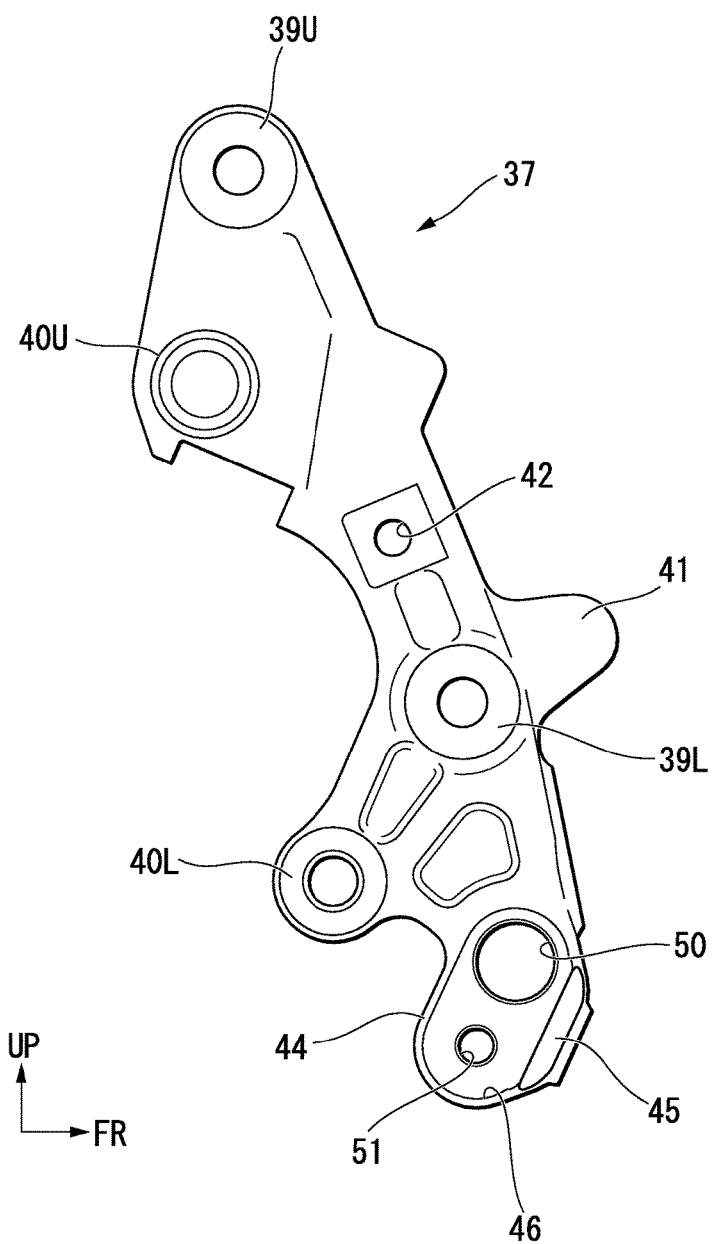
FIG. 6 is a right side view of a brake caliper bracket according to the embodiment.
Figure 7:
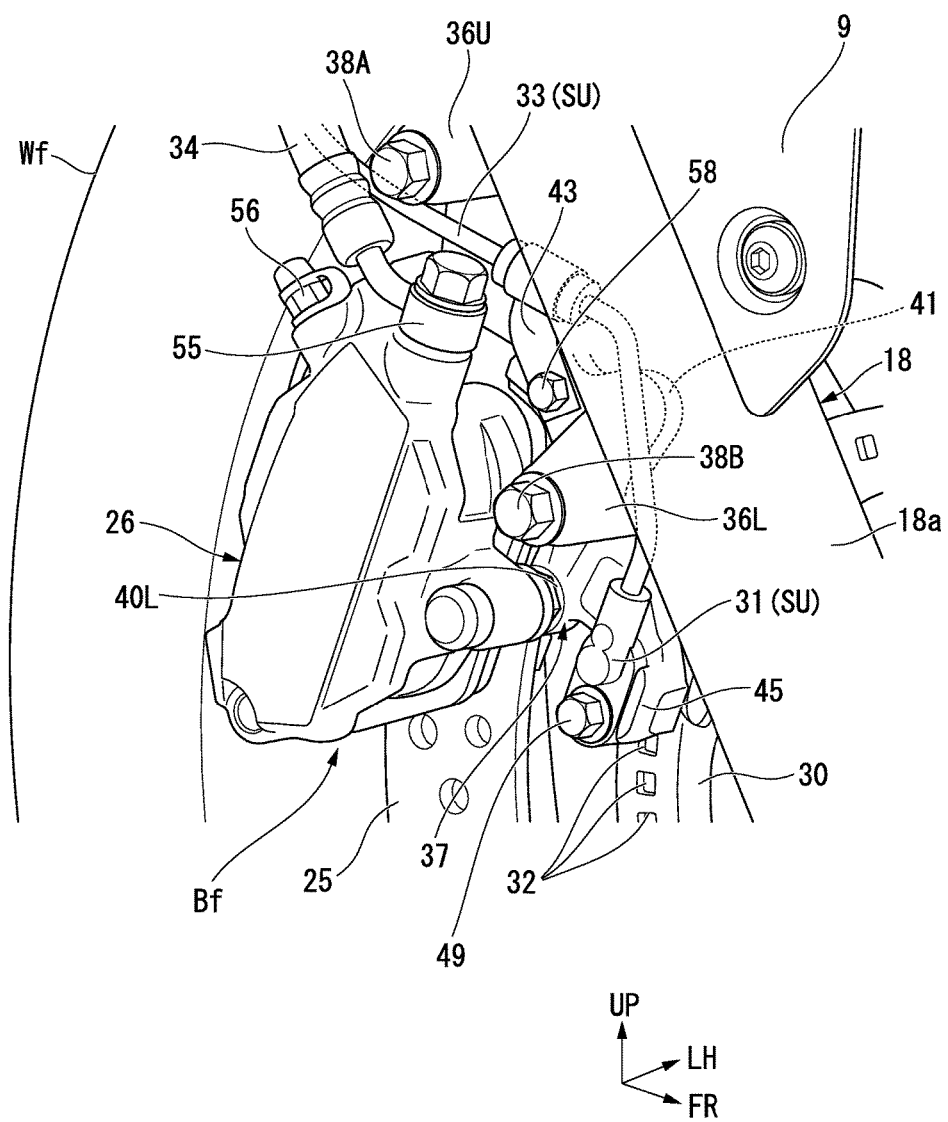
FIG. 7 is a perspective view seen obliquely from a right front upper side of the II part of FIG. 1 of the saddle-riding-type vehicle according to the embodiment.

FIG. 6 is a view of the brake caliper bracket 37 seen from the right side of the vehicle. FIG. 7 is a view of the brake caliper 26 that is attached to the brake caliper bracket 37 seen obliquely from a right front upper part of the right front fork 18.

The brake caliper bracket 37 is formed of cast components that have a thickness in the vehicle width direction and that are elongated substantially in the vertical direction. A fastening boss part 39U is provided on an upper end part of the brake caliper bracket 37. A fastening boss part 39L is provided at a slightly lower position than a middle position in the vertical direction of the brake caliper bracket 37. The brake caliper bracket 37 is arranged at an inner side in the vehicle width direction of the upper and lower rearward extension stays 36U, 36L of the front fork 18. The upper fastening boss part 39U is fastened to the rearward extension stay 36U by the bolt 38A. The lower fastening boss part 39L is fastened to the rearward extension stay 36L by the bolt 38B. A caliper-holding part 40U that protrudes toward the vehicle body rearward direction is provided at a lower neighborhood position of the upper fastening boss part 39U of the brake caliper bracket 37. A caliper-holding part 40L that protrudes toward the vehicle body rearward direction is provided at a lower neighborhood position of the lower fastening boss part 39L of the brake caliper bracket 37. The caliper-holding parts 40U, 40L hold the brake caliper 26.

A frontward extension part 41 that extends toward the vehicle frontward direction and that has a tongue shape is provided at a frontward position of the lower fastening boss part 39L of the brake caliper bracket 37. The frontward extension part 41 protrudes frontward from a more inner position in the vehicle width direction than an end surface at an outer side in the vehicle width direction of the fastening boss part 39L. The end surface at the outer side in the vehicle width direction of the fastening boss part 39L has a step difference with respect to an end surface at an outer side in the vehicle width direction of the frontward extension part 41. The frontward extension part 41 extends in a vehicle frontward direction so as to overlap in a side view with the rearward extension stay 36L at an inner side in the vehicle width direction of the lower rearward extension stay 36L in a state where the brake caliper bracket 37 is fastened and fixed to the rearward extension stays 36U, 36L. As shown in FIG. 4, a gap d in the vehicle width direction is formed between the frontward extension part 41 and the rearward extension stay 36L.

The brake caliper bracket 37 includes a fastening hole 42 used for stay attachment. As shown in FIG. 2 and FIG. 5, a holding stay 43 for holding the sensor cable 33 is fastened and fixed to the fastening hole 42 used for stay attachment by a bolt 58.

A sensor attachment part 44 used for attaching the pickup sensor 31 (wheel speed sensor) is provided to extend at a lower position than the lower fastening boss part 39L of the brake caliper bracket 37. A recess part 46 which has an elongated hole shape and on which the pickup sensor 31 is arranged is provided on a surface at an outer side in the vehicle width direction of the sensor attachment part 44. One side wall (side wall close to the axle 28) that is directed in a long diameter direction of the recess part 46 is greatly elevated to the outer side in the vehicle width direction compared to other regions, and the surface of the side wall is in contact with a flat outer surface of the pickup sensor 31. The side wall of the sensor attachment part 44 that is in contact with the flat outer surface of the pickup sensor 31 constitutes a regulation rib 45 that regulates a displacement of the pickup sensor 31. As shown in FIG. 2, the regulation rib 45 is formed so as to be directed along a tangential line T direction of a circumference (arrangement circumference) constituted by the arrangement of the pickup holes 32 of the pulsar ring 30 (pulsar plate).

Figure 8:
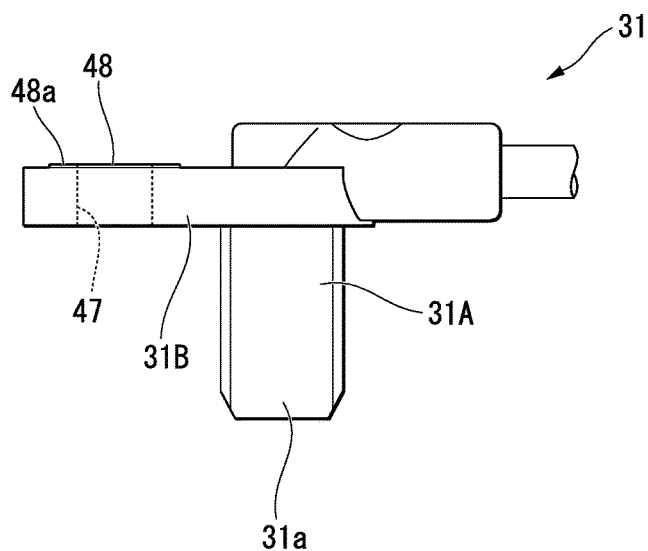
FIG. 8 is a side view of the wheel speed sensor according to the embodiment.

FIG. 8 is a view showing a side surface of the pickup sensor 31. As shown in FIG. 8, the pickup sensor 31 has a sensor main body 31A that has a detection part 31a having a cylindrical shape and a holder part 31B that holds the sensor main body 31A and that has an oval shape in a top view. A bolt insertion hole 47 is provided on the holder part 31B. The substantially entire holder part 31B is formed of a resin. A collar 48 made of a metal is buried at a bolt insertion hole 47 portion of the holder part 31B. A fastening bolt 49 (refer to FIG. 2) for fastening and fixing the pickup sensor 31 to the sensor attachment part 44 of the brake caliper bracket 37 is inserted in the bolt insertion hole 47. A flange 48a for directly receiving a press load by a head part of the fastening bolt 49 is formed on the collar 48 so as to protrude.

As shown in FIG. 6, a penetration hole 50 in which the detection part 31a of the pickup sensor 31 is inserted and a fastened hole 51 in which the fastening bolt 49 is fastened are provided on the sensor attachment part 44 of the brake caliper bracket 37. The fastening bolt 49 is fastened in the fastened hole 51 in a state where the detection part 31a is inserted in the penetration hole 50, and thereby, the pickup sensor 31 is attached to the sensor attachment part 44. In a state where the pickup sensor 31 is attached to the sensor attachment part 44 as described above, a front end part of the detection part 31a of the pickup sensor 31 faces, on the rotation trajectory of the pickup hole 32, the base wall 30a of the pulsar ring 30 so as to have a small gap between the base wall 30a of the pulsar ring 30 and the front end part of the detection part 31a of the pickup sensor 31.

Figure 9:
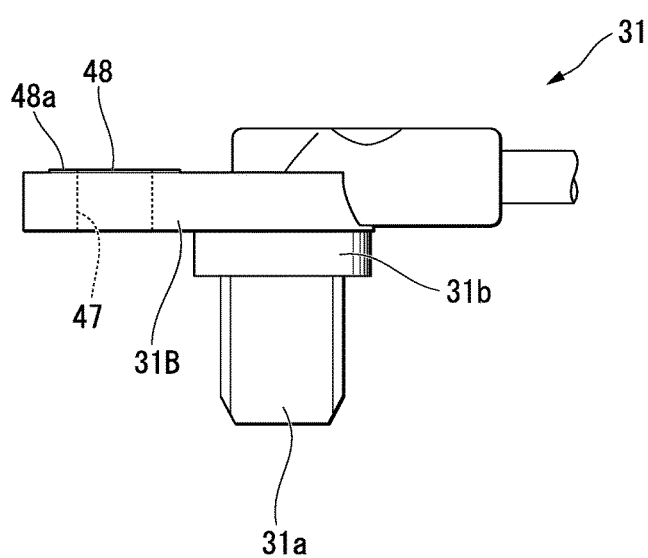
FIG. 9 is a side view of a wheel speed sensor according to another embodiment of the present invention.
Figure 10:
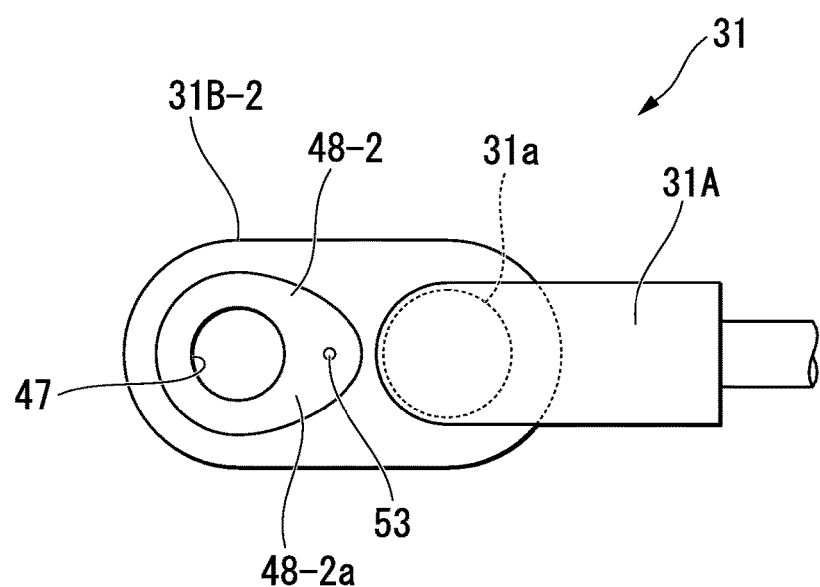
FIG. 10 is a front view of a wheel speed sensor according to still another embodiment of the present invention.

A structure shown in FIG. 9 and a structure shown in FIG. 10 can be also used for the pickup sensor 31.

In the pickup sensor 31 of a modified example shown in FIG. 9, a rotation stop part 31b that protrudes more downward than a lower surface of the holder part 31B and that has an oval-shaped cross-section is provided on a base part side of the sensor main body 31. The detection part 31a having a cylindrical shape protrudes from a lower end of the rotation stop part 31b. A fit recess part which has an oval shape and to which the rotation stop part 31b can be fitted is formed on the sensor attachment part 44 of the brake caliper bracket 37.

In the case of the pickup sensor 31 of this modified example, by fitting the rotation stop part 31b to the fit recess part of the sensor attachment part 44, it is possible to regulate the rotation and position displacement of the pickup sensor 31. Therefore, it is possible to remove the regulation rib 45 that is provided at the sensor attachment part 44, and the appearance from the vehicle outside can be improved.

A holder part 31B-2 of a modified example shown in FIG. 10 has a structure in which a flange part 48-2a of a collar 48-2 that is buried in the bolt insertion hole 47 is formed in a substantially oval shape that greatly protrudes toward the sensor main body 31A, and the rotation of a flange part 48-2a is stopped by the resin of the holder part 31B-2 using a regulation pin 53. In the case of this modified example, it is possible to receive, by the flange part 48-2a having a substantially oval shape, a press load by the head part of the fastening bolt at a neighborhood part of the sensor main body 31A, and it is possible to regulate the rotation of the collar 48-2 using the regulation pin 53.

As shown in FIG. 2 and FIG. 7, the pickup sensor 31 of the wheel speed detection device 23f is arranged at a lower position than the rearward extension stay 36L of the brake caliper bracket 37 that is attached to the front fork 18. The sensor cable 33 that is drawn from the pickup sensor 31 is drawn to the inner side in the vehicle width direction of the rearward extension stay 36L. The sensor cable 33 that is drawn to the inner side in the vehicle width direction of the rearward extension stay 36L is inserted in the gap d (refer to FIG. 4) between the frontward extension part 41 of the brake caliper bracket 37 and the rearward extension stay 36L and is arranged toward the upper side of the rearward extension stay 36L. Then, the sensor cable 33 that is drawn to the upper side of the rearward extension stay 36L is drawn to the outer side in the vehicle width direction of the brake caliper bracket 37 and is locked to the brake caliper bracket 37 by the holding stay 43.

When the sensor cable 33 is arranged in this way, it is preferable that the pickup sensor 31 be attached to the brake caliper bracket 37 in advance.

As shown in FIG. 2 and FIG. 7, a connection part 55 for connecting the brake hose 34 to the brake caliper 26 is provided on a front upper side of the brake caliper 26 to protrude. A gap is provided at a space between the connection part 55 and an outer surface in the vehicle width direction of the brake caliper bracket 37. A further upstream region of the sensor cable 33 that is held by the holding stay 43 is inserted in the gap between the connection part 55 and the brake caliper bracket 37 and is arranged together with the brake hose 34 toward a vehicle body frame F direction.

As shown in FIG. 2 and FIG. 7, a breather 56 is provided to protrude on a rear upper end part of the brake caliper 26. The breather 56 discharges air within a brake circuit to the outside.

As shown in FIG. 3 and FIG. 4, the pickup sensor 31 that is supported by the front fork 18 via the brake caliper bracket 37 is arranged at a more rearward position than the front fork 18 such that at least part of the pickup sensor 31 overlaps with the front fork 18 in a front view of the vehicle.

As described above, in the sensor unit attachment structure according to the present embodiment, the sensor cable 33 that is drawn from the pickup sensor 31 passes under the inner side in the vehicle width direction of the rearward extension stay 36L to extend upward and is then drawn to the outer side in the vehicle width direction of the brake caliper bracket 37 to be locked to the brake caliper bracket 37 by the holding stay 43. Therefore, although the sensor cable 33 is slightly bent in the vehicle width direction as the sensor cable 33 passes under the inner side in the vehicle width direction of the rearward extension stay 36L, the sensor cable 33 is drawn to the vicinity of the brake caliper 26 without greatly meandering in the vehicle front-to-rear direction.

Accordingly, by adopting this sensor unit attachment structure, it is possible to allow the cable length of the sensor cable 33 to be as short as possible and arrange the sensor cable 33 in a state where a slant of the sensor cable 33 is prevented.

When the sensor cable 33 is arranged around the brake caliper 26, the pickup sensor 31 is attached to the sensor attachment part 44 of the brake caliper bracket 37 in advance, the sensor cable 33 is locked via the holding stay 43 to the outer surface in the vehicle width direction of the brake caliper bracket 37, and in that state, the brake caliper bracket 37 is fastened and fixed to the rearward extension stays 36U, 36L. Thereby, it is possible to facilitate the work.

Specifically, in the sensor unit attachment structure according to the present embodiment, the frontward extension part 41 that extends so as to overlap in a side view with the rearward extension stay 36L at a more inner side in the vehicle width direction than the rearward extension stay 36L is provided on the brake caliper bracket 37, and the sensor cable 33 is arranged to be inserted through the gap d between the rearward extension stay 36L and the frontward extension part 41. Therefore, the displacement of the sensor cable 33 to the inward direction in the vehicle width direction is regulated by the frontward extension part 41 of the brake caliper bracket 37 at the position opposed to the rearward extension stay 36L.

Accordingly, by adopting this sensor unit attachment structure, the sensor cable 33 can be arranged sufficiently close to the pulsar ring 30 and the brake disk 25 without interfering with the pulsar ring 30 and the brake disk 25. Therefore, the components that are arranged in the vicinity of the front wheel Wf are further collectively arranged at the center side in the vehicle width direction, and thereby, it is possible to make the structure around the front wheel Wf compact.

Further, in the sensor unit attachment structure according to the present embodiment, a gap is provided between the brake caliper bracket 37 and the connection part 55 of the brake hose 34 that is provided to protrude on a front upper edge part of the brake caliper 26, and the sensor cable 33 that is drawn to the outer side in the vehicle width direction of the brake caliper bracket 37 at a more upper position than the rearward extension stay 36L is arranged to be inserted through the gap between the connection part 55 and the brake caliper bracket 37. Therefore, even at the more upper position than the rearward extension stay 36L, the sensor cable 33 can be arranged compactly around the brake caliper 26 without causing the sensor cable 33 to greatly meander. Accordingly, it is possible to further shorten the cable length of the sensor cable 33, and it is possible to further prevent a slant of the sensor cable 33.

In the sensor unit attachment structure according to the present embodiment, the regulation rib 45 that comes into contact with the outer side surface of the pickup sensor 31 and that regulates the displacement of the pickup sensor 31 is integrally formed on the sensor attachment part 44 of the brake caliper bracket 37. Therefore, it is possible to reliably regulate the position displacement in the rotation direction of the pickup sensor 31 by the regulation rib 45 without interposing the pickup sensor 31 between the brake caliper bracket 37 and the cover to be attached and without providing a plurality of bolt fastening parts for strongly fixing the pickup sensor 31.

Accordingly, by adopting this structure, it is possible to simplify the fixation part of the pickup sensor 31 with respect to the brake caliper bracket 37, and it is possible to reduce the number of components and make the structure around the front wheel Wf further compact and lightweight.

Further, in the present embodiment, the regulation rib 45 is formed to be directed along the tangential direction of the arrangement circumference of the pickup holes 32 of the pulsar ring 30. Therefore, it is possible to detect the pickup hole 32 by the pickup sensor 31 in a state where the fixation direction of the pickup sensor 31 is appropriate.

In the sensor unit attachment structure according to the present embodiment, the pickup sensor 31 that is attached to the brake caliper bracket 37 is arranged at a more rearward position than the front fork 18 such that at least part of the pickup sensor 31 is overlapped with the front fork 18 in a vehicle front view. Therefore, it is possible to prevent mud and gravel from hitting directly on the pickup sensor 31 by the front fork 18 when the vehicle is traveling.

The present invention is not limited to the above embodiment, and a variety of design changes can be made without departing from the scope of the invention. For example, in the above embodiment, the sensor unit attachment structure is applied to a motorcycle as a form of a saddle-riding-type vehicle; however, the vehicle to which the sensor unit attachment structure is applied is not limited to a motorcycle and may be a saddle-riding-type vehicle such as a three-wheeled vehicle.

DESCRIPTION OF THE REFERENCE SYMBOLS

1: MOTORCYCLE (SADDLE-RIDING-TYPE VEHICLE)
18: FRONT FORK
24: CONTROL UNIT
25: BRAKE DISK
26: BRAKE CALIPER
30: PULSAR RING (PULSAR PLATE)
31: PICKUP SENSOR (WHEEL SPEED SENSOR)
32: PICKUP HOLE
33: SENSOR CABLE
34: BRAKE HOSE
36L: REARWARD EXTENSION STAY
37: BRAKE CALIPER BRACKET
41: FRONTWARD EXTENSION PART
45: REGULATION RIB
55: CONNECTION PART
SU: SENSOR UNIT
Wf: FRONT WHEEL

The invention claimed is:

1. A saddle-riding vehicle sensor unit attachment structure, comprising:
a front fork that pivotally supports a front wheel and that has a rearward extension stay which extends toward a vehicle rearward direction at a lower edge part;
a brake disk that is supported by the front wheel so as to be rotatable integrally with the front wheel;
a pulsar plate which is supported by the front wheel so as to be rotatable integrally with the front wheel and in which a plurality of pickup holes are arranged along a rotation direction;
a brake caliper that is supported by the rearward extension stay and that gives a frictional force to the brake disk at the time of braking; and
a sensor unit that has a wheel speed sensor which detects a rotation speed of the pulsar plate based on a rotation of the pulsar plate and a sensor cable that is connected to the wheel speed sensor and that outputs a signal which is detected by the wheel speed sensor to a control unit, wherein
a brake caliper bracket that holds the brake caliper is attached to the rearward extension stay,
the wheel speed sensor of the sensor unit is attached to a lower position than the rearward extension stay of the brake caliper bracket,
the sensor cable that is drawn from the wheel speed sensor is arranged toward an upward direction at an inner side in a vehicle width direction of the rearward extension stay and is then drawn to an outer side in a vehicle width direction of the brake caliper bracket at an upper position than the rearward extension stay to be supported by the brake caliper bracket,
the brake caliper bracket has a frontward extension part that extends so as to overlap in a side view with the rearward extension stay at a more inner side in the vehicle width direction than the rearward extension stay, and
the sensor cable is inserted through a space between the rearward extension stay and the frontward extension part to be arranged toward an upward direction.

2. The saddle-riding vehicle sensor unit attachment structure according to claim 1, wherein
a regulation rib that comes into contact with a side surface of the wheel speed sensor and that regulates a displacement of the wheel speed sensor is formed on an attachment part of the wheel speed sensor of the brake caliper bracket.

3. The saddle-riding vehicle sensor unit attachment structure according to claim 2, wherein
the regulation rib is formed to be directed along a tangential direction of an arrangement circumference of the pickup holes of the pulsar plate.

4. The saddle-riding vehicle sensor unit attachment structure according to claim 1, wherein
the wheel speed sensor is arranged such that at least part of the wheel speed sensor is overlapped with the front fork in a vehicle front view.

5. The saddle-riding vehicle sensor unit attachment structure according to claim 1, wherein
a connection part of a brake hose that is connected to a brake operation part is provided on an edge part on a vehicle front side of the brake caliper, and
the sensor cable that is drawn to an outer side in the vehicle width direction of the brake caliper bracket is arranged to be inserted through a space between the brake caliper bracket and the connection part.

* * * * *